(12) United States Patent
Munz et al.

(10) Patent No.: US 12,177,715 B2
(45) Date of Patent: Dec. 24, 2024

(54) METHODS FOR INTERWORKING BETWEEN WIRELESS AND WIRED COMMUNICATION NETWORKS

(71) Applicant: Telefonaktiebolaget LM Ericsson (publ), Stockholm (SE)

(72) Inventors: Hubertus Munz, Aachen (DE); Balázs Varga, Budapest (HU); György Miklós, Pilisborosjenő (HU); Torsten Dudda, Aachen (DE); Dhruvin Patel, Aachen (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 228 days.

(21) Appl. No.: 17/279,373

(22) PCT Filed: Sep. 19, 2019

(86) PCT No.: PCT/SE2019/050889
§ 371 (c)(1),
(2) Date: Mar. 24, 2021

(87) PCT Pub. No.: WO2020/067966
PCT Pub. Date: Apr. 2, 2020

(65) Prior Publication Data
US 2021/0400523 A1    Dec. 23, 2021

Related U.S. Application Data

(60) Provisional application No. 62/737,166, filed on Sep. 27, 2018.

(51) Int. Cl.
*H04W 28/02* (2009.01)
*H04L 47/2491* (2022.01)

(52) U.S. Cl.
CPC ..... *H04W 28/0268* (2013.01); *H04L 47/2491* (2013.01)

(58) Field of Classification Search
None
See application file for complete search history.

(56) References Cited

U.S. PATENT DOCUMENTS

2016/0301960 A1* 10/2016 Sze ............... H04N 21/6373
2018/0160424 A1    6/2018 Cavalcanti et al.
(Continued)

FOREIGN PATENT DOCUMENTS

WO    2018125686 A2    7/2018
WO    2019132861 A1    7/2019
(Continued)

OTHER PUBLICATIONS

EPO Communication with Supplementary European Search Report dated Jun. 3, 2022 for Patent Application No. 19866555.6, consisting of 11-pages.
(Continued)

*Primary Examiner* — Andre Tacdiran
(74) *Attorney, Agent, or Firm* — Weisberg I.P. Law, P.A.

(57) ABSTRACT

A Virtual Endpoint and a method therein for enabling end-to-end connectivity between a wireless communication network and a wired communication network are disclosed. A Virtual Endpoint is implemented in the wireless communication network and certain user and control plane features used in the wired communication network are implemented in the VEP. The VEP maps data traffic between a device in the wireless communication network and a device in the wired communication network based on Quality-of-Service (QoS) and performs required actions defined by the features used in the wired communication network.

11 Claims, 12 Drawing Sheets

(56) References Cited

U.S. PATENT DOCUMENTS

| | | | |
|---|---|---|---|
| 2018/0192390 A1 | 7/2018 | Li et al. | |
| 2020/0045093 A1* | 2/2020 | May | H04L 12/66 |
| 2020/0412813 A1* | 12/2020 | Mong | B61L 27/04 |
| 2021/0204172 A1* | 7/2021 | Rost | H04W 28/10 |
| 2021/0232321 A1* | 7/2021 | Martineau | G06F 3/0649 |
| 2021/0243641 A1* | 8/2021 | Gangakhedkar | H04W 28/24 |
| 2021/0250787 A1* | 8/2021 | Kolding | H04L 47/24 |

FOREIGN PATENT DOCUMENTS

| | | |
|---|---|---|
| WO | 2019166081 A1 | 9/2019 |
| WO | 2019214810 A1 | 11/2019 |

OTHER PUBLICATIONS

SA WG2 Meeting #128Bis Temporary Document S2-188233 (revision of S2-18xxxx); Title: QoS Negotiation between 3GPP and TSN networks KI#3.1; Agenda Item: 6.15; Source: Huawei, HiSilicon; Work Item/Release: FS_Vertical_LAN/Rel-16; Document for: Approval; Date and Location: Aug. 20-24, 2018, Sophia Antipolis, France, consisting of 8-pages.

Gabriel Brown; Ultra-Reliable Low-Latency 5G for Industrial Automation; Heavy Reading White Paper; Qualcomm Inc.; Jun. 8, 2018, consisting of 11-pages.

International Search Report and Written Opinion dated Jan. 7, 2020 for International Application No. PCT/SE2019/050889 filed Sep. 19, 2019, consisting of 12-pages.

3GPP TR 23.725 V1.2.0; 3rd Generation Partnership Project; Technical Specification Group Services and System Aspects; Study on enhancement of Ultra-Reliable Low-Latency Communication (URLLC) support in the 5G Core Network (5GC) (Release 16); Dec. 2018, consisting of 75-pages.

Draft Standard for Local and metropolitan area networks-Bridges and Bridged Networks; Amendment: Stream Reservation protocol (SRP) Enhancements and Performance Improvements; IEEE P802.1Qcc/D2.3; IEEE LAN/MAN Standards Committee if the IEEE Computer Society; May 3, 2018, consisting of 214-pages.

3GPP TS 23.501 V15.1.0; 3rd Generation Partnership Project; Technical Specification Group Services and System Aspects; System Architecture for the 5G System; Stage 2 (Release 15); Mar. 2018, consisting of 201-pages.

* cited by examiner

METHODS FOR INTERWORKING BETWEEN WIRELESS AND WIRED COMMUNICATION NETWORKS

CROSS-REFERENCE TO RELATED APPLICATIONS

This application is a Submission Under 35 U.S.C. § 371 for U.S. National Stage Patent Application of International Application No.: PCT/SE2019/050889, filed Sep. 19, 2019 entitled "METHOD AND APPARATUS FOR INTERWORKING BETWEEN WIRELESS AND WIRED COMMUNICATION NETWORKS," which claims priority to U.S. Provisional Application No.: 62/737,166, filed Sep. 27, 2018, the entireties of both of which are incorporated herein by reference.

TECHNICAL FIELD

Embodiments herein relate to interworking between wireless and wired communication networks. In particular, they relate to end-to-end connectivity between a 5G wireless communication network and a Time Sensitive Networking (TSN) network.

BACKGROUND

Factory automation in the 'Industry 4.0' vision, referred to as the fourth industrial revolution, puts high requirements on the network infrastructure to support a vast number of new use cases. These use cases are pure plant measurement to high precise motion control in a robotized factory cell. Very promising technologies for these purposes is on the one side Time Sensitive Networking (TSN) as standardized by the IEEE 802.1 TSN Task Group and the fifth generation (5G) mobile communication technology currently standardized by the Third Generation Partnership Project (3GPP).

TSN is based on the IEEE 802.3 Ethernet standard, so is wired communication, whereas 5G involves wireless radio communication using Long Term Evolution (LTE) and/or New Radio (NR). TSN describes a collection of features for e.g. time synchronization, guaranteed low latency transmissions and high reliability to make legacy Ethernet, designed for best-effort communication, deterministic. The TSN features available today can be grouped into the following categories:

Time Synchronization e.g. IEEE 802.1AS
Bounded Low Latency e.g. IEEE 802.1Qav, IEEE 802.1Qbu, IEEE 802.1Qbv, IEEE 802.1Qch, IEEE 802.1Qcr
Ultra-Reliability e.g. IEEE 802.1CB, IEEE 802.1Qca, IEEE 802.1Qci
Network Configuration and Management e.g. IEEE 802.1Qat, IEEE 802.1Qcc, IEEE 802.1Qcp, IEEE 802.1CS The configuration and management of a TSN network may be implemented in different manners, either in a centralized or in a distributed setup as defined in IEEE 802.1Qcc. The different configuration models are shown in FIG. 1-3.

FIG. 1 shows a distributed TSN configuration model.
FIG. 2 shows a centralized TSN configuration model.
FIG. 3 shows a fully centralized TSN configuration model.

Within a TSN network the communication endpoints are called Talker and Listener. All the switches, i.e. bridges, in between Talker and Listener need to support certain TSN features, like e.g. IEEE 802.1AS time synchronization. All nodes that are synchronized in the network belong to a so called TSN domain. TSN communication is only possible within such a TSN domain.

The communication between Talker and Listener happens in streams. A stream is based on certain requirements in terms of data rate and latency given by an application implemented at Talker and Listener. The TSN configuration and management features are used to setup the stream and guarantee the stream's requirements across the network. In the distributed model from FIG. 1, the Talker and Listener might for example use the Stream Reservation Protocol (SRP) to setup and configure a TSN stream in every switch along the path from Talker to Listener in the TSN network. Nevertheless, some TSN features require a central management entity called Centralized Network Configuration (CNC) as shown in FIG. 2. The CNC uses for example Netconf and YANG models to configure the switches in the network for each TSN stream. This also allows the use of time-gated queueing as defined in IEEE 802.1Qbv that enables data transport in a TSN network with deterministic latency. With time-gated queueing on each switch, queues are opened or closed following a precise schedule that allows high priority packets to pass through the switch with minimum latency and jitter, if it arrives at ingress port within the time the gate is scheduled to be open. In the fully centralized model as shown in FIG. 3, also a Centralized User Configuration (CUC) entity is added that is used as a point of contact for Listener and Talker. The CUC collects stream requirements and endpoint capabilities from the devices and communicates with the CNC directly. The details about TSN configuration is explained in IEEE 802.1Qcc.

To connect devices wirelessly to a TSN network, 5G seems to be a promising solution. Also, the 5G standard addresses factory use cases through a lot of new features, especially on the radio access network (RAN) to make it more reliable and decrease the transmit latency compared to 4G. The 5G network consists of three main components, which are user entity (UE), radio access network (RAN) instantiated as the base station or gNB and nodes within the 5G core network (SGCN). The 5G network architecture is illustrated in FIG. 4. The 5G network architecture comprises Data Plane comprising UE, gNB and User Plane Function (UPF), and Control Plane comprising e.g. Network Repository Function (NRF), Policy Control Function (PCF), Access Management Function (AMF), Session Management Function (SMF), Network Exposure Function (NEF), Unified Data Management (UDM) etc.

An ongoing research challenge is the inter-working of 5G and TSN as illustrated in FIG. 5. Both technologies define own methods for network management and configuration and different mechanisms to achieve communication determinism that must somehow be arranged to enable end-to-end deterministic networking for industrial networks.

One way of 5G-TSN interworking is to let the 5G system act as a TSN bridge. The 5G network needs to offer some control interfaces towards the TSN network depending upon the TSN configuration model chosen as explained above. In the central configuration model, the central control entities CUC/CNC might occur on both sides of the 5G network. Furthermore, TSN networks of various topologies could be deployed on both sides in contrast to FIG. 5 where only a single endpoint is depicted behind the UE. If the 5G network acts as a TSN bridge, it is required that TSN-capable devices, e.g. bridges and endpoints, are deployed on both sides of the 5G network.

In TS 23.501 section 5.6.10.2 the support of Protocol Data Unit (PDU) sessions of type Ethernet in a 5G network is explained. On the N6 interface between PDU Session Anchor (PSA) UPF and a Data Network (DN), two potential options are explained for PDU sessions of type Ethernet. At first it is possible to have a one-to-one mapping between an N6 interface and a PDU session and as a second option a mapping based on MAC addresses of multiple PDU sessions to a N6 interface. The solution explained herein can be applied to any configuration option.

FIG. 6 illustrates the protocol transition at PSA UPF for Ethernet type PDU sessions as explained in TS 29.561, i.e. Ethernet frame handling at UPF.

There are no methods available to allow a connection of devices using 5G, supporting no or just a limited set of TSN-features to a TSN network over a 5G network.

Any traffic bridged to a TSN network without being registered as explained above in the TSN domain as a TSN stream will be handled as best-effort traffic without guarantees on quality-of-service (QoS). This way, end-to-end QoS may not be guaranteed.

SUMMARY

Therefore it is an object of embodiments herein to provide a method for enabling end-to-end connectivity with guaranteed QoS between a wireless communication network, e.g. a 5G network and a wired communication network, e.g. a TSN network.

According to one aspect of embodiments herein, the object is achieved by a method performed in a communication network for enabling end-to-end connectivity between a wireless communication network and a wired communication network. The method comprises implementing a Virtual Endpoint, VEP, in the wireless communication network and implementing in the VEP certain user and control plane features used in the wired communication network. The method further comprises mapping data traffic, in the VEP, between a device in the wireless communication network and a device in the wired communication network based on QoS and performing required actions defined by the features used in the wired communication network.

According to one aspect of embodiments herein, the object is achieved by a method performed in a Virtual Endpoint (VEP) implemented in a wireless communication network for enabling end-to-end connectivity to a wired communication network. The VEP is implemented with certain user and control plane features used in the wired communication network. The VEP receives a communication request from a device in either the wireless communication network or the wired communication network and determines a required QoS. The VEP further maps data traffic between a device in the wireless communication network and a device in the wired communication network based on the required QoS and performs required actions defined by the features used in the wired communication network.

According to one aspect of embodiments herein, the object is achieved by a Virtual Endpoint (VEP) implemented in a wireless communication network for enabling end-to-end connectivity to a wired communication network. The VEP is configured to have certain user and control plane features used in the wired communication network. The VEP is configured to receive a communication request from a device in either the wireless communication network or the wired communication network. The VEP is further configured to determine a required QoS for a data stream of either the wireless communication network or the wired communication network and map data traffic between a device in the wireless communication network and a device in the wired communication network based on the required QoS. The VEP is further configured to perform required actions defined by the features used in the wired communication network.

According to embodiments herein, a solution defines a function in the 5G user plane, that handles certain TSN features for devices being connected over 5G to a TSN network. The solution therefore allows an interworking between the 5G and TSN networks with end-to-end guaranteed QoS. This function may be called a Virtual Endpoint (VEP). The VEP may be realized as virtual listener and/or virtual talker depending upon the role of a 5G device, for example a UE or an application running on top respectively.

The VEP may be used in any TSN configuration mode, so either distributed, centralized or fully centralized, as introduced above.

In the case of a distributed TSN configuration model, the VEP may directly communicate to the nearest switch in the TSN network. In a fully centralized model it may be a reference point to CUC.

Multiple VEP instances may be implemented in the 5G network. In TSN, one endpoint is able to communicate using multiple TSN streams. A VEP from a TSN perspective is a single endpoint. In the most common scenario, a VEP also corresponds to one 5G device with one PDU session in the 5G network. Traffic from one TSN stream will be mapped at the VEP to one QoS Flow and vice-versa. Traffic from multiple TSN streams will be mapped to multiple QoS Flows within the same PDU session.

Multiple benefits may be achieved by introducing the Virtual Endpoint (VEP) function in the 5G user plane:
  It allows to connect non-TSN devices to a TSN network with guaranteed end-to-end QoS.
  It allows to connect non-Ethernet devices to a TSN network with guaranteed end-to-end QoS
  TSN features may be implemented in the 5G network centrally, for example to avoid a configuration over the air interface or in case of a feature-lacking at endpoints or bridges.
  TSN and Ethernet control traffic, e.g. Link Layer Discovery Protocol (LLDP), time synchronization etc., does not need to be carried over the 5G radio interface but handled by VEP.

BRIEF DESCRIPTION OF THE DRAWINGS

Examples of embodiments herein are described in more detail with reference to attached drawings in which.

DETAILED DESCRIPTION

Please note that the terms "UE", "user equipment", "wireless device", "device" "endpoint", "endpoint device" are used interchangeably in this document.

According to embodiments herein, a solution to connect 5G endpoints to a TSN network is to introduce a new 5G user plane feature. The new 5G user plane feature enables end-to-end QoS-guaranteed connectivity in a network comprising of a 5G and a TSN parts. The function or feature introduced may be called Virtual Endpoint (VEP).

Figure 1:
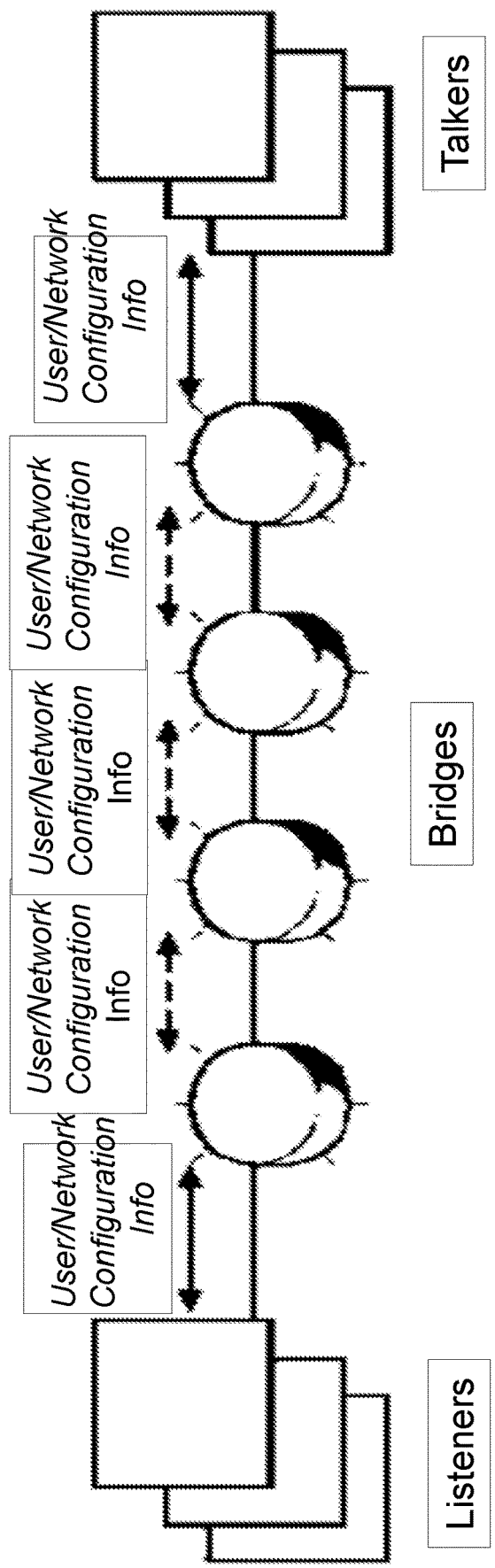
FIG. 1 is a schematic block diagram depicting a distributed TSN configuration model.
Figure 2:
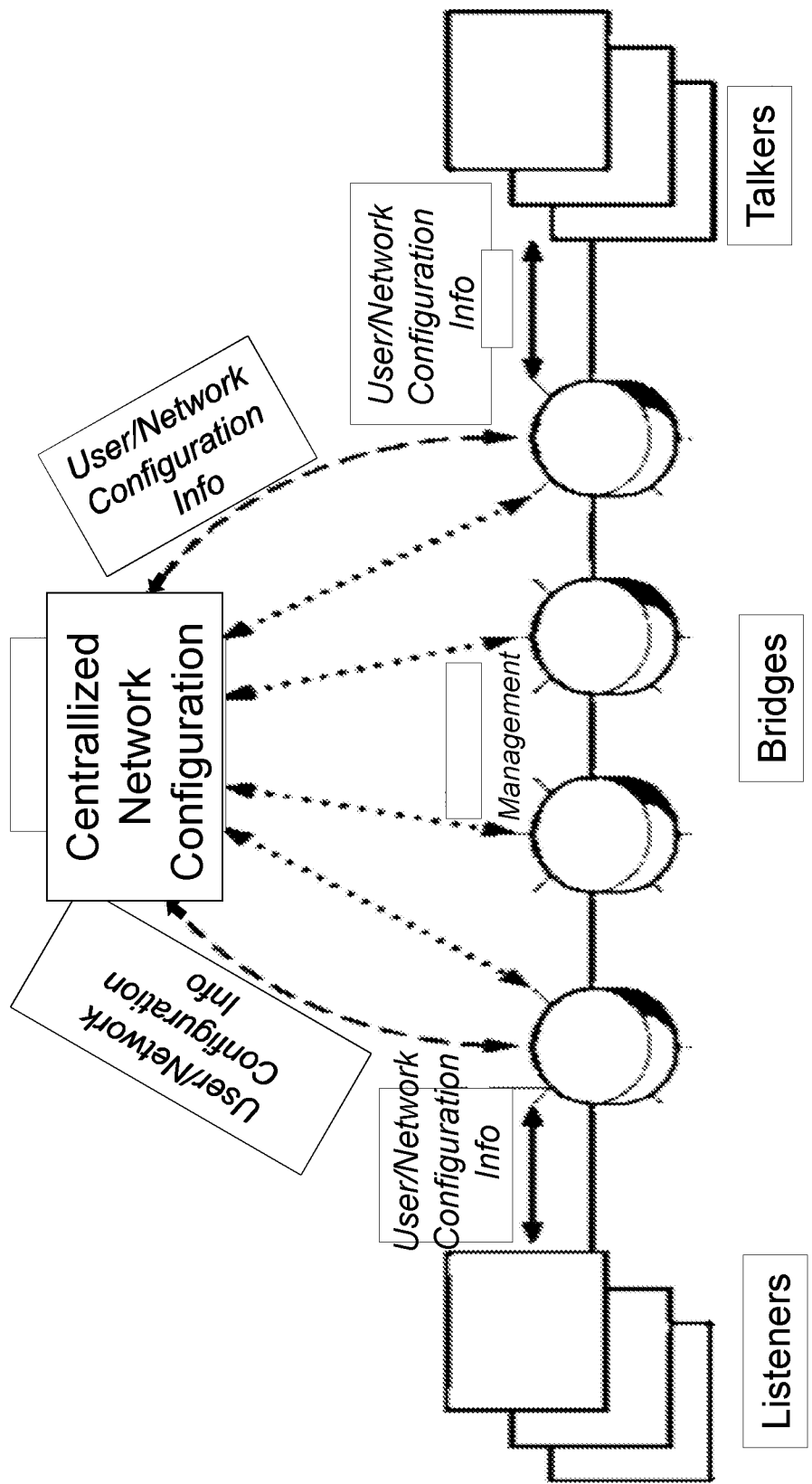
FIG. 2 is a schematic block diagram depicting a centralized TSN configuration model.
Figure 3:
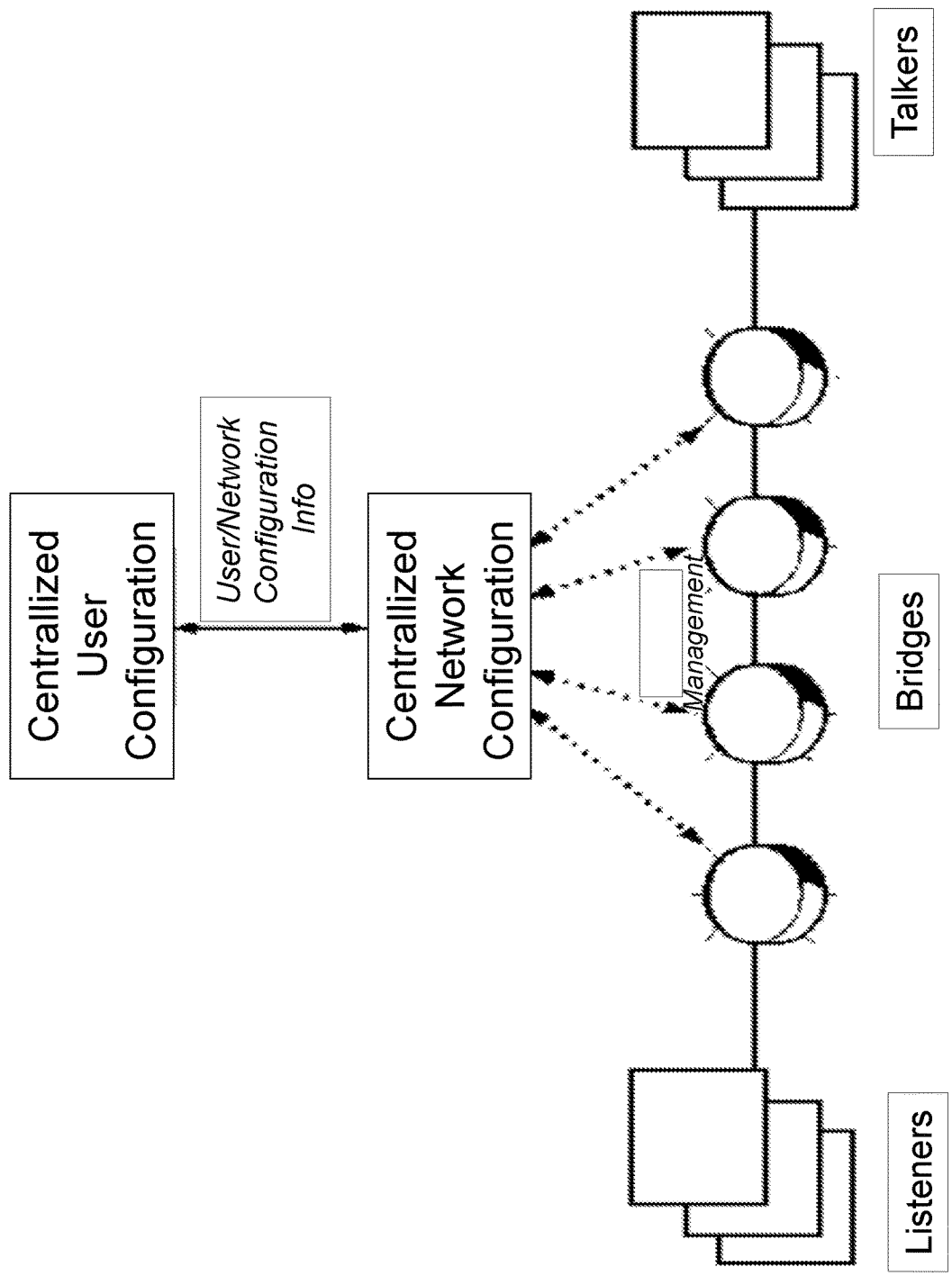
FIG. 3 is a schematic block diagram depicting a fully centralized TSN configuration model.
Figure 4:
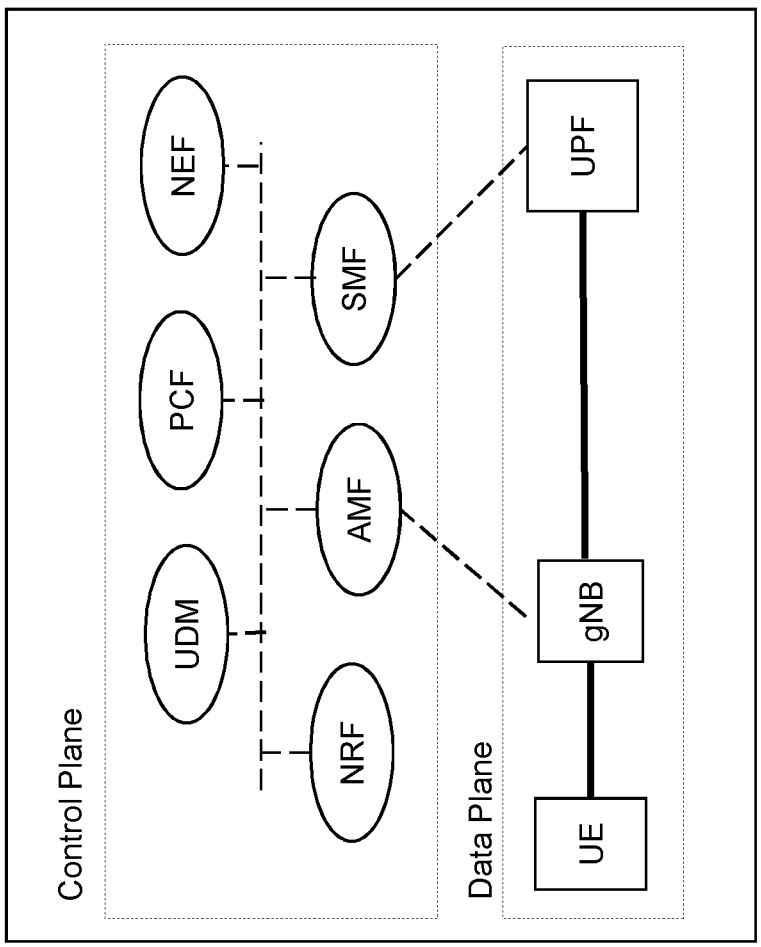
FIG. 4 is a schematic block diagram illustrating a 5G network architecture.
Figure 5:
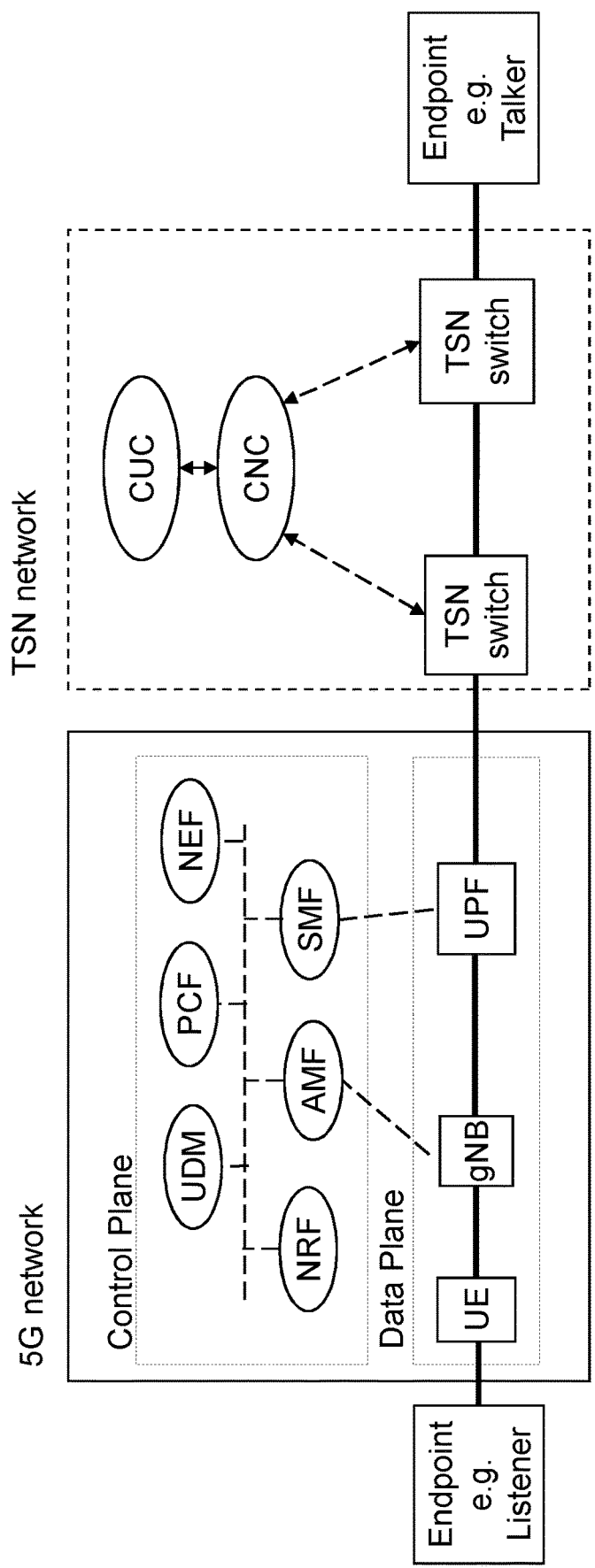
FIG. 5 is a schematic block diagram illustrating 5G and TSN network architecture interworking.
Figure 6:
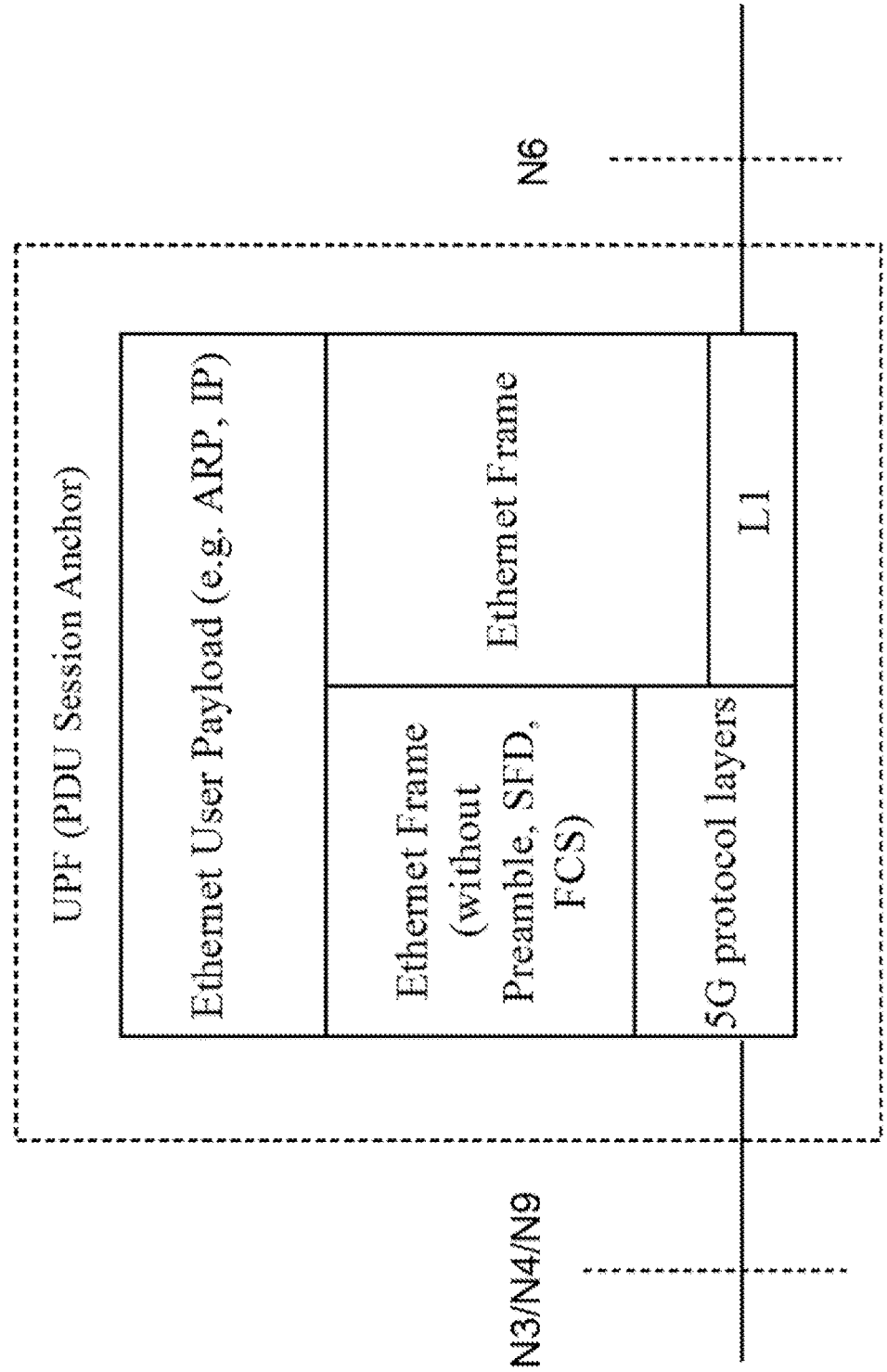
FIG. 6 is a schematic block diagram illustrating Ethernet frame handling at UPF from TS 29.561.
Figure 7:
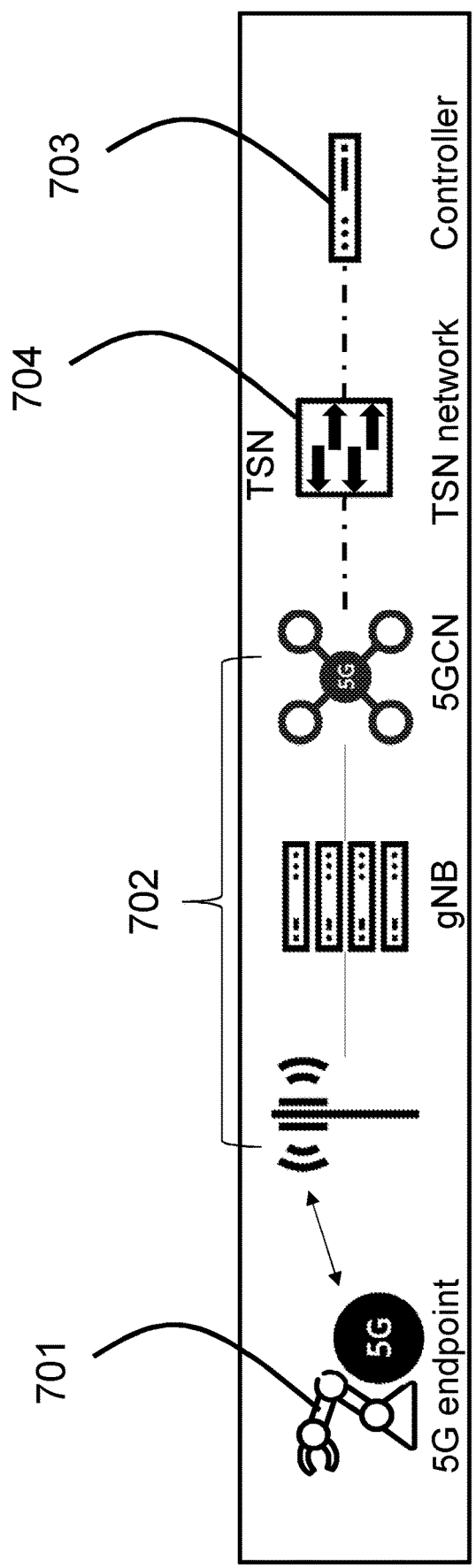
FIG. 7 is a schematic block diagram illustrating 5G-TSN interworking in an industrial setup.

A generic example where a VEP may be used from the industrial domain is given in FIG. 7 showing 5G-TSN interworking in an industrial setup. A 5G endpoint 701 therein may be an industrial robot wirelessly connected to a 5G network 702. The robot 701 may be on the factory shop floor. A corresponding robot controller 703 e.g. a Programmable Logic Controller (PLC) is connected to a TSN network 704, e.g. in the factory's IT room. For a robot to be able to communicate to the controller 703 in an end-to-end QoS-enabled way, it is necessary that both belong to the same TSN domain, as explained above. A VEP may implement a complete set or a part of the TSN features and corresponding mappings to 5G QoS functions required for TSN-5G interworking.

A VEP may be implemented in the 5G user plane close to or as part of the User Plane Function (UPF). It is responsible to map QoS in the 5G network and in the TSN network and is involved in the configuration.

A VEP may be used for PDU sessions of Type Ethernet or IP. In the most common scenario a VEP may be used to map traffic from one QoS Flow to one TSN stream and vice versa. Nevertheless, it may also be possible to map traffic between one or more TSN streams and one or more QoS Flows using one VEP instance. This means using one VEP instance for one PDU session. In addition, it may also be possible to combine traffic from multiple PDU sessions in a single VEP.

Multiple VEP instances may be used within one UPF. If one VEP instance is used for one PDU session then multiple TSN streams may be connected to that VEP and for example one-to-one mapped to multiple QoS Flows within the PDU session as explained above.

Figure 8:
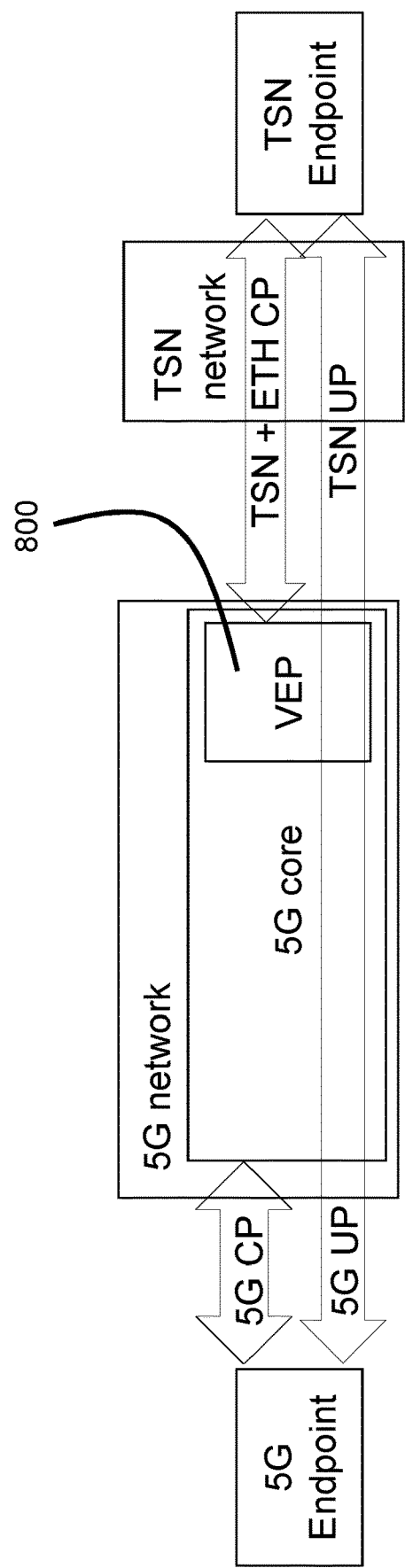
FIG. 8 is a schematic block diagram illustrating TSN control and data plane with virtual endpoint.

FIG. 8 illustrates the flow of control and user plane when introducing a VEP 800 in case all Ethernet and TSN control plane traffic is handled at the VEP, for example for an PDU session of type IP, e.g. a non-Ethernet, non-TSN device behind the UE.

Figure 9:
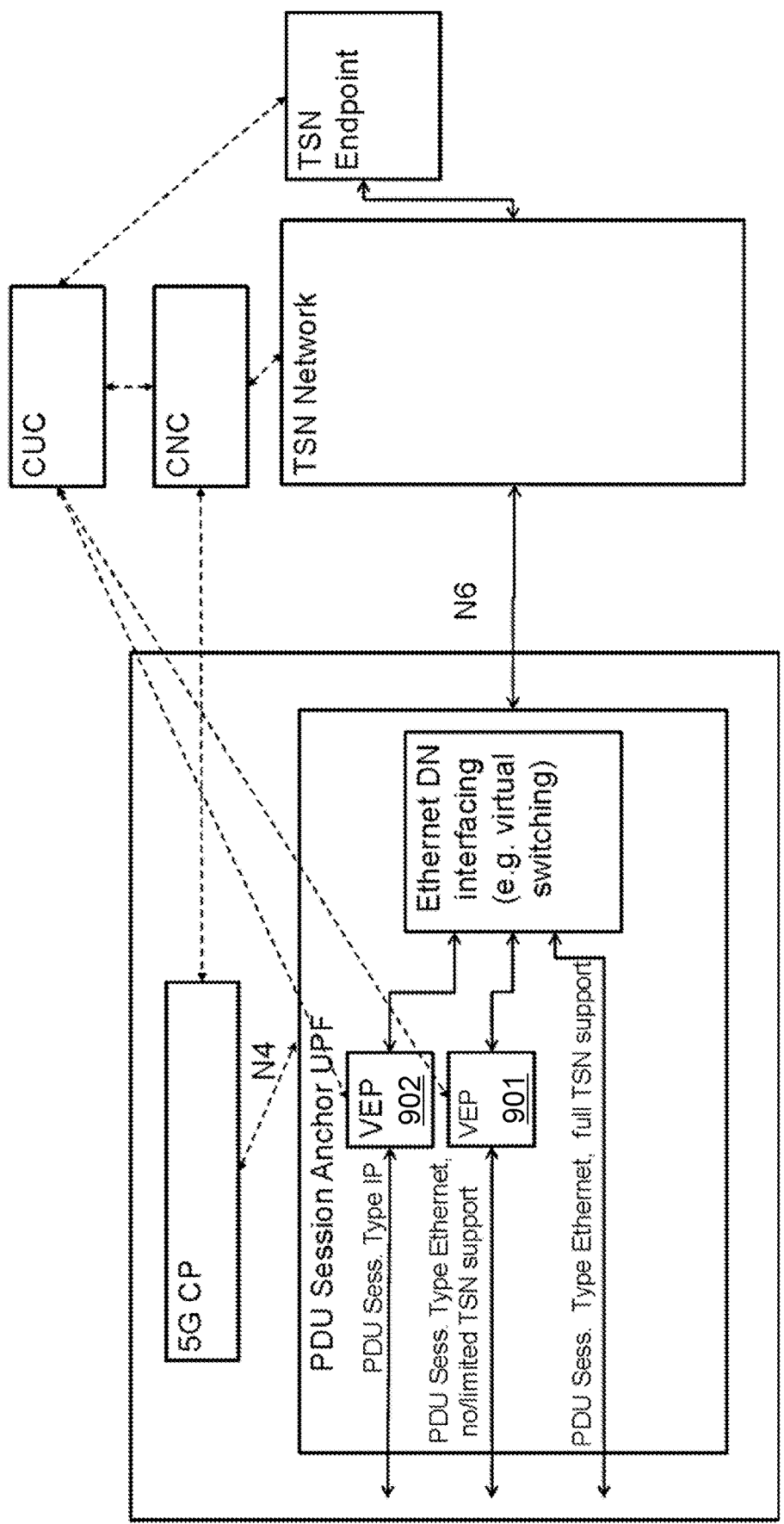
FIG. 9 is a schematic block diagram illustrating VEP deployments as part of the UPF for different PDU session types.

FIG. 9 illustrates how a VEP 901, 902 may be implemented as part of the UPF for PDU sessions of type IP or of type Ethernet. Further functionalities of the UPF like packet filtering are not displayed in here but may also be used in conjunction with a VEP. A VEP for PDU sessions that are not fully supporting TSN may be used within a UPF in parallel to PDU sessions of type Ethernet where TSN is supported end-to-end between two endpoints across the 5G network, as also illustrated in FIG. 9.

Figure 10:
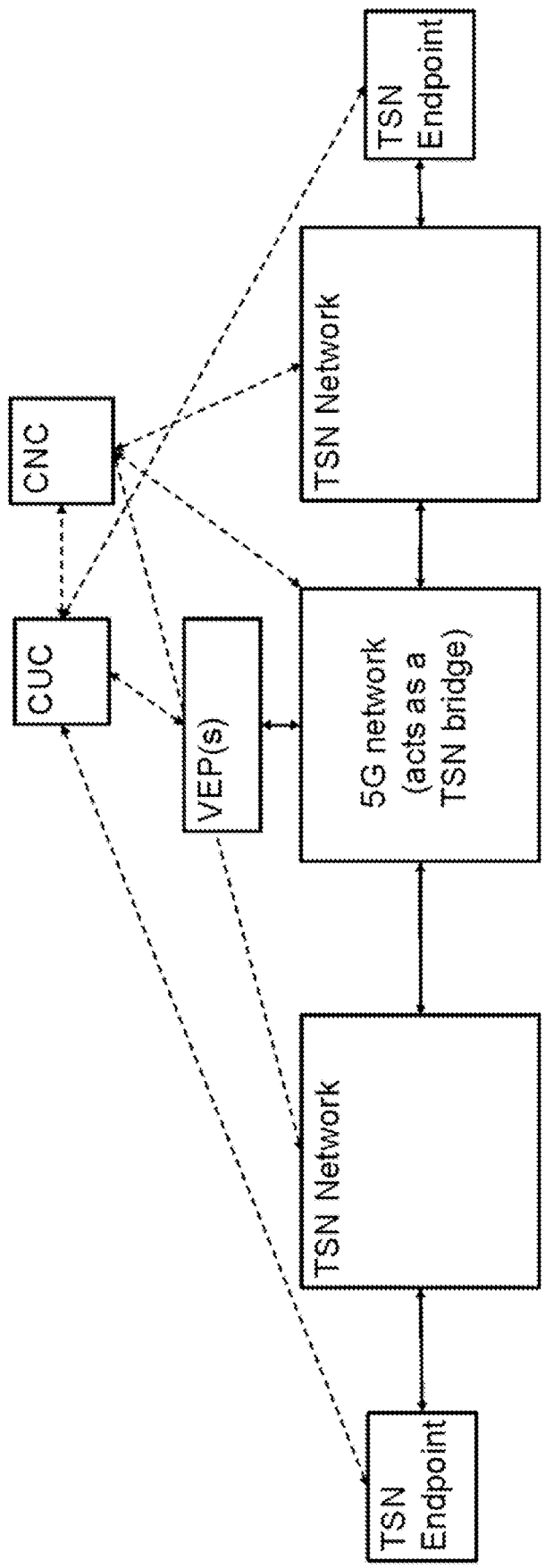
FIG. 10 is a schematic block diagram illustrating VEP(s) as seen by the external TSN network configuration.

FIG. 10 is a schematic block diagram illustrating VEP(s) as seen by the external TSN network configuration.

The main functionalities of a VEP are:
- mapping of PDU session(s) to TSN stream(s)—only relevant if the PDU session is of type IP, otherwise it's a standard action done at the UPF.
- establishing or modifying TSN streams or PDU sessions or QoS Flows and translating the different QoS domains correspondingly.
- implementing and supporting certain user and control plane features used in TSN, like time-aware traffic shaping as defined in 802.1Qbv and time synchronization as defined in 802.1AS-rev used for that purpose.
- interfacing with CUC and or the nearest TSN bridge in the TSN domain.

A VEP maps one or more TSN streams to one or more PDU sessions or QoS Flows as explained above. It therefore maintains a mapping table internally. For mapping purposes, the VEP may use the TSN stream ID or PDU session ID or QoS Flow IDs (QFIs) respectively. In case of one-to-one mapping of e.g. one QoS Flow to one TSN stream this mapping is of course much simpler.

In case a PDU session of type IP is used, the VEP will use a Medium Access Control (MAC) address from a local MAC address pool or from another source, like e.g. a manually assigned MAC address. Ethernet forwarding of the IP packets from an IP PDU session is then possible to an external Ethernet DN network. This MAC address will be advertised towards the DN and also populated towards the TSN control instances.

For mapping purposes, it is further necessary that the VEP may also support various TSN features like 802.1AS, 802.1Qbv, 802.1Qcc etc.

To be able to create or modify PDU sessions, the VEP may need to interface the SMF in the 5G network. This interfacing may be done using the existing N4 interface if a VEP is implemented as part of the UPF. Furthermore, below are two embodiment methods, describing the sequence of the communication between a VEP and a 5G endpoint acting as Talker i.e. transmitter of data, or Listener, i.e. receiver of data.

Therefore, according to embodiments herein, the VEP 800, 901, 902 is configured to have certain user and control plane features used in the wired communication network. The VEP is further configured to receive a communication request from a device in either the wireless communication network or the wired communication network and determine a required QoS for a data stream of either the wireless communication network or the wired communication network. The VEP is further configured to map data traffic between a device in the wireless communication network and a device in the wired communication network based on the required QoS and perform required actions defined by the features used in the wired communication network.

Procedure if 5G endpoint is a talker:
1) Application at the 5G endpoint will request a communication link from UE.
2) UE PDU session requests or uses existing one to VEP/UPF.
3) VEP estimates the required QoS for a TSN stream by either or a combination of:
   a. Mapping of QoS Flow ID (QFI) selected by UE to TSN stream QoS;
   b. Dedicated application QoS specific to TSN given by the UE or the application on top;
   c. Pre-configured QoS settings within the VEP for the TSN network;
   d. Check QoS settings with CUC in the TSN network for the TSN network;
4) Based on the QoS settings, the VEP will try to establish a TSN stream; or map it to an existing TSN stream or initiate a TSN stream setup towards the CNC or CUC depends upon how the TSN network is configured, which the VEP shall be aware of by using TSN features as defined in e.g. 802.1Qcc.
5) In case the TSN stream setup is successful the user plane communication starts; the VEP will then map user plane packets from the PDU session or the specific QoS Flow as explained above to the established TSN stream as well as performing required actions defined by the TSN features used in the TSN network.

According to one embodiment, when estimating the required QoS for the TSN stream in step 3), the VEP may consider the internal communication performance parameters within the 5G network, i.e. between the VEP and the end-device. e.g. one way or round-trip latency, packet error rate or reliability indicator, etc. When the VEP communicates QoS requirements to the TSN network, it considers those internal performance parameters, since the TSN network "thinks" that the VEP and the endpoint are the same. Therefore, when it comes for example to a required end-to-end latency value to be communicated to the TSN network, instead of indicating the real requirement of X ms, a harder requirement of X ms, i.e. VEP to end-device delay, is indicated. To find out the internal communication performance parameters, communication protocols within the 5G network may be used, such as:

VEP communicates directly or via further 5G core function with the gNB to obtain measurements or estimates of the UE-gNB, i.e. 5G radio interface communication performance, for example, latency measurements or estimates. The gNB may use measurements to the UE itself, and may also consider its own traffic or load situation to further estimate how well or fast it can serve the specific UE.

Probing packets may be used between the VEP and the UE, and back, e.g. in order to obtain the latency between VEP and UE.

Procedure if 5G endpoint is a listener:
1) Application at the TSN endpoint will request a TSN stream or a TSN stream will be requested by the CUC depending upon the configuration model.
2) A TSN stream request will be received at the VEP.
3) The VEP will also receive the QoS for the TSN stream and map it to 5G QoS. The mapping may be based on a fixed configuration setting. If the VEP analyzes that the QoS cannot be supported by the 5G network it might decline the TSN stream request.
4) Based on the QoS settings the VEP will either establish a new PDU session or use an existing PDU session or modify an existing PDU session to meet the requested QoS.
5) In case the TSN stream and PDU session setup is successful the user plane communication starts. The VEP will then map user plane packets from the TSN stream to the corresponding PDU session and QoS Flow, as well as performing required actions defined by the TSN features used in the TSN network.

According to an embodiment, in step 3), in order to be able to decide whether the QoS of the TSN stream can be fulfilled, the VEP may consider measurements or estimates of the 5G internal communication performance between the VEP and the end-device. Those measurements may be obtained as described above for step 3) for the talker procedure.

Specific features a VEP may support are for example, time synchronization to an external grandmaster clock as explained in IEEE 802.1AS-rev to support for example time-aware scheduling as defined in IEEE 802.1Qbv. The VEP will be involved in the setup of a time-aware TSN communication and forward packets to/from a 5G endpoint that is not time-aware accordingly.

In future it is envisioned that 5G network will interwork with TSN enabling industrial use case. In such situation, implementing complex TSN features on UE side will become a cumbersome task. The embodiments herein proposes a new feature, Virtual Endpoint (VEP), to the 5G user plane, which enables interworking of TSN and 5G network. It further allows also connection of non-TSN devices and also non-Ethernet devices to a TSN network using 5G.

Example Embodiments of methods for enabling end-to-end connectivity between a wireless communication network, e.g. 5G and a wired communication network, e.g. TSN network, will be described in the following.

Figure 11:
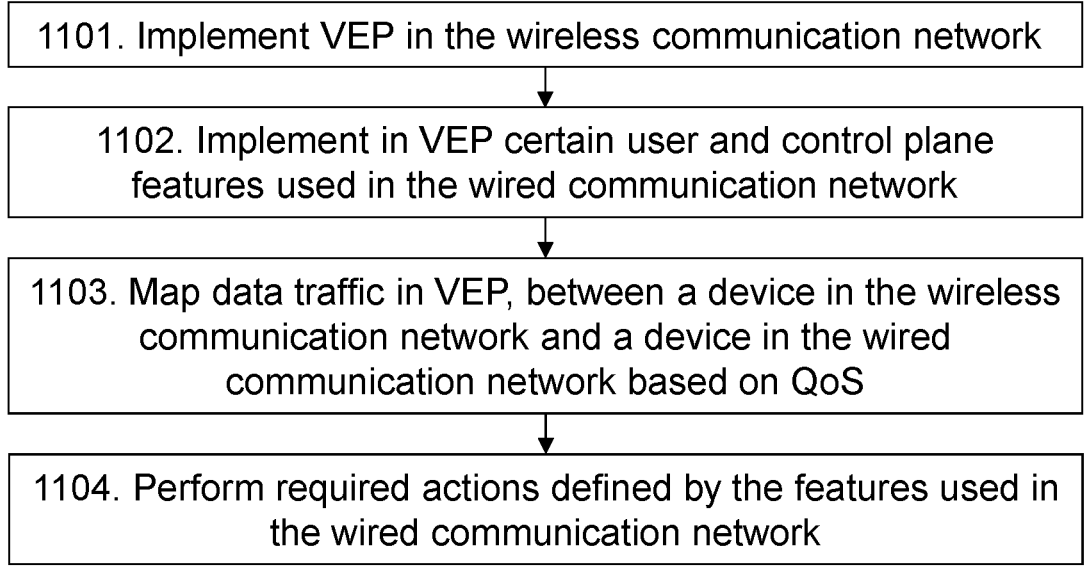
FIG. 11 is a flow chart illustrating a method for enabling end-to-end connectivity between a wireless communication network and a wired communication network according to embodiments herein.

Embodiment 1: A method in a communication network for enabling end-to-end connectivity between a wireless communication network, e.g. 5G and a wired communication network, e.g. TSN network. The method comprises the following actions with reference to FIG. 11:

Action 1101
Implementing a Virtual Endpoint, VEP, in the wireless communication network;

Action 1102
Implementing in the VEP certain user and control plane features used in the wired communication network;

Action 1103
Mapping data traffic, in the VEP, between a device in the wireless communication network and a device in the wired communication network based on Quality-of-Service, QoS;

Action 1104
Performing required actions defined by the features used in the wired communication network.

According to some embodiments, the VEP may be implemented in the 5G network user plane close to or as a part of User Plane Function, UPF.

According to some embodiments, Action 1103 mapping data traffic between a device in the wireless communication network and a device in the wired communication network based on QoS may comprise establishing or modifying TSN streams or Protocol Data Unit, PDU sessions or QoS Flows and translating different QoS domains correspondingly.

Figure 12:
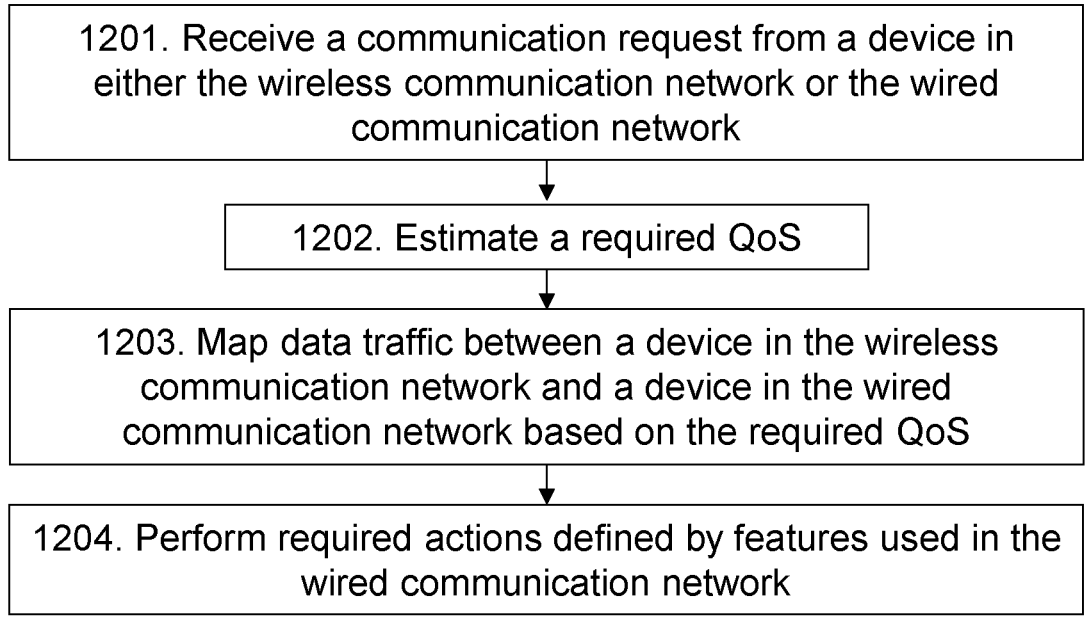
FIG. 12 is a flow chart illustrating a method performed in a Virtual Endpoint for enabling end-to-end connectivity between a wireless communication network and a wired communication network according to embodiments herein.

Embodiment 2: A method performed in a Virtual Endpoint, VEP implemented in a wireless communication network for enabling end-to-end connectivity to a wired communication network. The VEP is configured to have certain user and control plane features used in the wired communication network. The method comprises the following actions with reference to FIG. 12:

Action 1201

Receiving a communication request from a device in either the wireless communication network or the wired communication network;

Action 1202

Estimating a required QoS;

Action 1203

Mapping data traffic between a device in the wireless communication network and a device in the wired communication network based on the required QoS;

Action 1204

Performing required actions defined by features used in the wired communication network.

The wireless communication network may be a $5^{th}$ generation, 5G, network and the wired communication network may be a Time Sensitive Networking, TSN, network. The communication session may be a Protocol Data Unit, PDU, session, the data stream may be a TSN stream.

Figure 13:
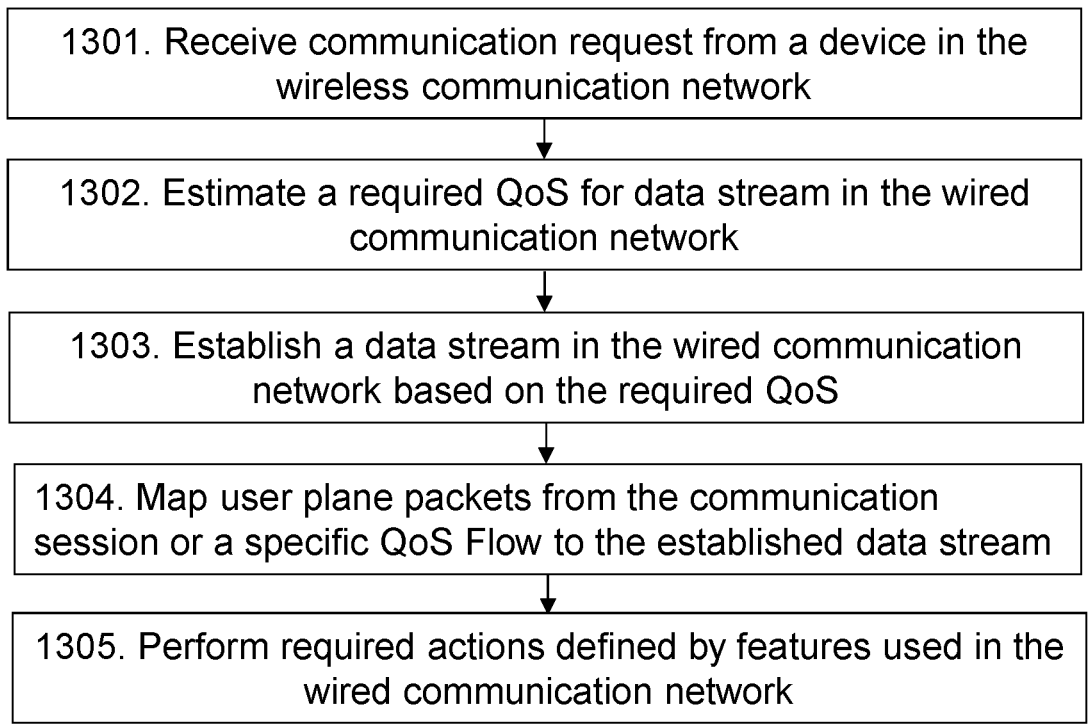
FIG. 13 is a flow chart illustrating a method performed in a Virtual Endpoint for enabling end-to-end connectivity between a wireless communication network and a wired communication network according to one embodiment herein.

Embodiment 3: A method performed in a Virtual Endpoint, VEP implemented in a wireless communication network for enabling end-to-end connectivity to a wired communication network. The VEP is configured to have certain user and control plane features used in the wired communication network. The endpoint or device in the wireless communication network is a talker, the method comprises the following actions with reference to FIG. 13:

Action 1301

Receiving a communication session request from a device in the wireless communication network;

Action 1302

Estimating a required QoS for a data stream in the wired communication network;

Action 1303

Establishing a data stream in the wired communication network based on the required QoS;

Action 1304

Mapping user plane packets from the communication session or a specific QoS Flow to the established data stream;

Action 1305

Performing required actions defined by features used in the wired communication network.

The wireless communication network may be a $5^{th}$ generation, 5G, network and the wired communication network may be a Time Sensitive Networking, TSN, network. The communication session may be a Protocol Data Unit, PDU, session, the data stream may be a TSN stream.

According to some embodiments herein, Action 1303 establishing a data stream based on the required QoS may comprise mapping to an existing data stream or initiating a data stream setup in the wired communication network.

According to some embodiments herein, Action 1302 estimating a required QoS may be performed by one or a combination of:

a. mapping a QoS Flow ID, QFI, selected by the device to a TSN stream QoS;
b. choosing a dedicated application QoS specific to the TSN given by the device;
c. choosing from pre-configured QoS settings within the VEP for the TSN network;
d. checking QoS settings with CUC in the TSN network for a TSN stream.

Figure 14:
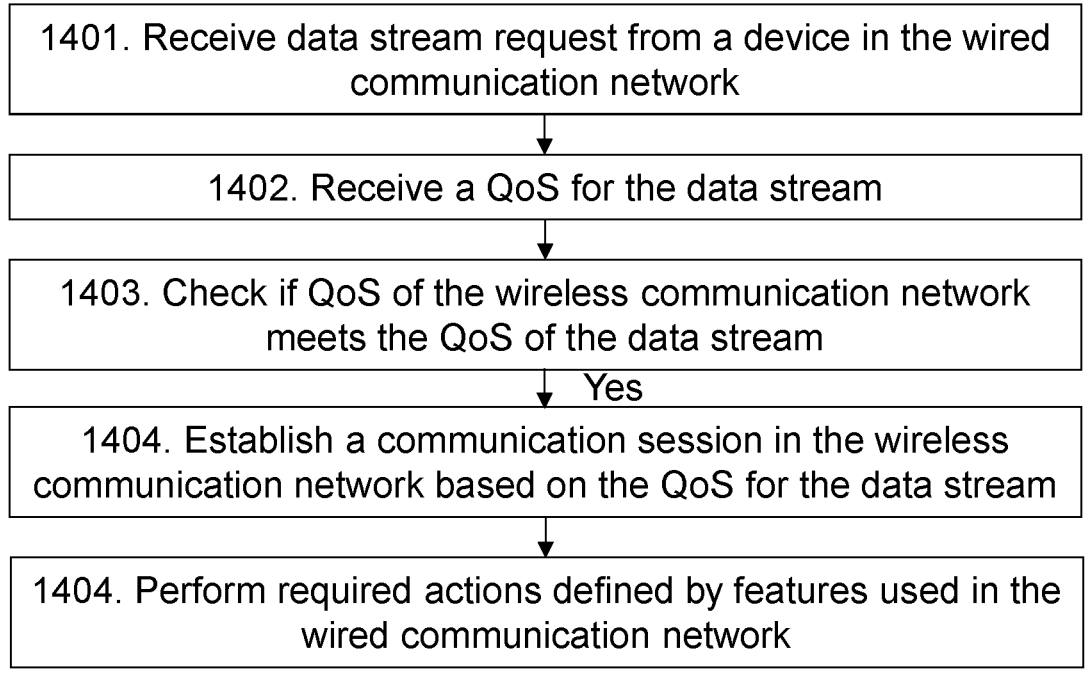
FIG. 14 is a flow chart illustrating a method performed in a Virtual Endpoint for enabling end-to-end connectivity between a wireless communication network and a wired communication network according to one embodiment herein.

Embodiment 4: A method performed in a Virtual Endpoint, VEP implemented in a wireless communication network for enabling end-to-end connectivity to a wired communication network. The VEP is configured to have certain user and control plane features used in the wired communication network. The endpoint or device in the wireless communication network is a listener, the method comprises the following actions with reference to FIG. 14:

Action 1401

Receiving a data stream request from a device in the wired communication network;

Action 1402

Receiving a QoS for the data stream;

Action 1403

Checking if QoS of the wireless communication network meets the QoS of the data stream;

Action 1404

If the QoS of the wireless communication network meets the QoS of the data stream, Establishing a communication session in the wireless communication network based on the QoS for the data stream;

Action 1405

Performing required actions defined by features used in the wired communication network.

According to some embodiments herein, Action 1404 establishing a communication session based on the QoS of the data stream may comprise establishing a new communication session or using an existing communication session or modify an existing communication session to meet the QoS of the data stream.

The invention claimed is:

1. A method for enabling end-to-end connectivity between a wireless communication network and a wired communication network, the method comprising:
    implementing a Virtual Endpoint (VEP) in the wireless communication network, the VEP being realized as one of a virtual listener and a virtual talker based on a role of a wireless device in the wireless communication network:
    when the role of the wireless device is a talker, the VEP being configured as a virtual listener to:
        set up a time sensitive networking (TSN) stream based at least in part on Quality-of-Service (QOS) settings; and
        map user plane packets from a QoS flow of the wireless communication network to the TSN stream; and
    when the role of the wireless device is a listener, the VEP being configured as a virtual talker to:
        receive a QoS for the TSN stream;
        map the received QoS to a QoS flow of the wireless communication network;
    implementing in the VEP user and control plane features used in the wired communication network;
    mapping data traffic, in the VEP, between the device in the wireless communication network and a device in the wired communication network based on the QoS flow of the wireless communication network; and
    performing required actions defined by the user and control plane features used in the wired communication network, the wireless communication network being a $5^{th}$ generation (5G) network and the wired communication network being a Time Sensitive Networking (TSN) network.

2. The method according to claim 1, wherein the VEP is implemented in a user plane of the 5G network one of either close to or as a part of User Plane Function (UPF).

3. The method according to claim 2, wherein mapping data traffic between a device in the wireless communication network and a device in the wired communication network based on QoS comprising:

one of either establishing or modifying one of TSN streams, Protocol Data Unit (PDU) sessions and QoS Flows, and translating different QoS domains correspondingly.

4. The method according to claim 1, wherein the mapping data traffic between the device in the wireless communication network and the device in the wired communication network based on QoS comprises:
one of establishing and modifying one of TSN streams, Protocol Data Unit (PDU) sessions and QoS Flows, and translating different QoS domains correspondingly.

5. A method performed in a Virtual Endpoint (VEP) implemented in a wireless communication network for enabling end-to-end connectivity to a wired communication network, the VEP is configured to have user and control plane features used in the wired communication network, the VEP being realized as one of a virtual listener and a virtual talker based on a role of a wireless device in the wireless communication network, the method comprising:
when the role of the wireless device is a talker:
setting up a time sensitive networking (TSN) stream based at least in part on Quality-of-Service (QOS) settings; and
mapping user plane packets from a QoS flow of the wireless communication network to the TSN stream; and
when the role of the wireless device is a listener:
receiving a QoS for the TSN stream;
mapping the received QoS to a QoS flow of the wireless communication network;
implementing user and control plane features used in the wired communication network;
mapping data traffic between the device in the wireless communication network and a device in the wired communication network based on the QoS flow of the wireless communication network;
receiving a communication request from the device in the wireless communication network or the device in the wired communication network;
estimating a required QoS; and
performing required actions defined by features used in the wired communication network, the wireless communication network being a $5^{th}$ generation (5G) network and the wired communication network being a Time Sensitive Networking (TSN) network.

6. A method performed in a Virtual Endpoint (VEP) implemented in a wireless communication network for enabling end-to-end connectivity to a wired communication network, the VEP is configured to have user and control plane features used in the wired communication network, the VEP being realized as one of a virtual listener and a virtual talker based on a role of a wireless device in the wireless communication network, the method comprising:
when the role of the wireless device is a talker:
setting up a time sensitive networking (TSN) stream based at least in part on Quality-of-Service (QOS) settings; and
mapping user plane packets from a QoS flow of the wireless communication network to the TSN stream; and
when the role of the wireless device is a listener:
receiving a QoS for the TSN stream;
mapping the received QoS to a QoS flow of the wireless communication network;
implementing user and control plane features used in the wired communication network;
mapping data traffic between the device in the wireless communication network and a device in the wired communication network based on the QoS flow of the wireless communication network;
receiving a communication session request from the device in the wireless communication network;
estimating a required QoS for a data stream in the wired communication network;
establishing a data stream in the wired communication network based on the required QoS;
mapping user plane packets from one of a communication session and a specific QoS Flow to the established data stream; and
performing required actions defined by features used in the wired communication network, the wireless communication network being a $5^{th}$ generation (5G) network and the wired communication network being a Time Sensitive Networking (TSN) network.

7. The method according to claim 6, wherein establishing the data stream based on the required QoS comprises mapping to an existing data stream or initiating a data stream setup in the wired communication network.

8. The method according to claim 7, wherein the communication session is a Protocol Data Unit (PDU) session, the data stream is a TSN stream.

9. The method according to claim 8, wherein estimating a required QoS is performed by one or a combination of:
a. mapping a QoS Flow ID (QFI) selected by the device to a TSN stream QoS;
b. choosing a dedicated application QoS specific to the TSN given by the device;
c. choosing from pre-configured QoS settings within the VEP for the TSN network; and
d. checking QoS settings with Centralized User Configuration (CUC) in the TSN network for a TSN stream.

10. The method according to claim 6, wherein the communication session is a Protocol Data Unit (PDU) session, the data stream is a TSN stream.

11. The method according to claim 10, wherein estimating the required QoS is performed by one or a combination of:
a. mapping a QoS Flow ID (QFI), selected by the device to a TSN stream QOS;
b. choosing a dedicated application QoS specific to the TSN network given by the device;
c. choosing from pre-configured QoS settings within the VEP for the TSN network; and
d. checking QoS settings with Centralized User Configuration (CUC) in the TSN network for the TSN stream.

* * * * *